(12) United States Patent
Saito

(10) Patent No.: US 6,744,894 B1
(45) Date of Patent: Jun. 1, 2004

(54) DATA MANAGEMENT SYSTEM

(75) Inventor: Makoto Saito, Tokyo (JP)

(73) Assignee: Mitsubishi Corporation, Tokyo (JP)

( * ) Notice: Subject to any disclaimer, the term of this patent is extended or adjusted under 35 U.S.C. 154(b) by 0 days.

(21) Appl. No.: 09/165,928

(22) Filed: Oct. 2, 1998

Related U.S. Application Data

(60) Division of application No. 08/733,504, filed on Oct. 18, 1996, now Pat. No. 5,974,141, and a continuation-in-part of application No. 08/416,037, filed on Mar. 31, 1995, now abandoned.

(30) Foreign Application Priority Data

| Apr. 1, 1994 | (JP) | 6-64889 |
| Sep. 30, 1994 | (JP) | 6-237673 |
| Oct. 27, 1994 | (JP) | 6-237673 |
| Oct. 27, 1994 | (JP) | 6-264201 |
| Nov. 2, 1994 | (JP) | 6-269959 |

(51) Int. Cl.$^7$ .................................... H04L 9/00
(52) U.S. Cl. .......................... 380/277; 705/57; 705/59; 705/52
(58) Field of Search ................ 705/53, 78, 26, 705/27, 51, 74, 59, 58, 71, 52, 54; 713/156, 155; 380/277, 278

(56) References Cited

U.S. PATENT DOCUMENTS

| 4,799,156 A | * | 1/1989 | Shavit et al. | 705/26 |
| 5,224,163 A | | 6/1993 | Gasser | 380/30 |
| 5,369,702 A | | 11/1994 | Shanton | 380/4 |
| 5,400,403 A | * | 3/1995 | Fahn et al. | 705/51 |
| 5,465,299 A | * | 11/1995 | Matsumoto et al. | 713/176 |
| 5,475,758 A | * | 12/1995 | Kikuchi | 713/156 |
| 5,479,514 A | | 12/1995 | Klonowski | |
| 5,504,818 A | | 4/1996 | Okano | 380/49 |
| 5,636,277 A | | 6/1997 | Nagahama | 380/4 |
| 5,646,999 A | | 7/1997 | Saito | 380/25 |
| 5,651,064 A | | 7/1997 | Newell | 380/4 |
| 5,974,141 A | * | 10/1999 | Saito | 705/52 |

FOREIGN PATENT DOCUMENTS

EP 0 354 774 B1 2/1990

OTHER PUBLICATIONS

Schneier, Applied Crytography, first edition, 10/93, Wiley, pp. 29–31, 42–56, 152, 153.*

* cited by examiner

*Primary Examiner*—Ayaz Sheikh
*Assistant Examiner*—Hosuk Song
(74) *Attorney, Agent, or Firm*—Westerman, Hattori, Daniels & Adrian, LLP

(57) ABSTRACT

The present invention provides a system to ensure security of data in a computer network system. A center certifies a public-key of user of the system and distributes a secret-key. A first system comprises the center in a network, an information provider and a plurality of users. The center identifies utilization status by requests of the secret-key. The data is encrypted by the secret-key and is stored and transferred, while the data to be stored and transferred is encrypted by a secret-key different from the secret-key of the transferred data. An original data label is added to the original data, and an edit label is added to the edited data, and the center does not store the data and stores only the original data label and the edit label. A second system comprises a center and an information provider in a network, and a plurality of users utilizing the network. The center stores the original data and editing scenario, and also the original data label, user label and edit label. The data is not transferred between the users, but data label encrypted by the public-key is transferred. In electronic commerce system, every data is distributed through a mediator in the network, data which is transferred from a maker to a user is encrypted by a secret-key for encryption, and data which is transferred from the user to the maker is encrypted by a secret-key for re-encryption.

42 Claims, 9 Drawing Sheets

Fig. 1A

LABEL OWNER INFORMATION

Fig. 1B

LABEL OWNER INFORMATION +
INFORMATION RELATING ORIGINAL COPYRIGHTED DATA

Fig. 1C

LABEL OWNER INFORMATION +
INFORMATION RELATING ORIGINAL COPYRIGHTED DATA +
EDIT TOOL INFORMATION + EDITING SCENARIO

Fig. 1D

LABEL OWNER INFORMATION +
INFORMATION RELATING ORIGINAL COPYRIGHTED DATA +
EDITION PROGRAM + EDITING SCENARIO

DATA MANAGEMENT SYSTEM

CROSS REFERENCE TO RELATED APPLICATIONS

This application is a Divisional of U.S. patent application Ser. No. 08/733,504 filed on Oct. 18, 1996, now U.S. Pat. No. 5,974,141, which is a continuation in part application of prior U.S. patent application Ser. No. 08/416,037 filed on Mar. 31, 1995, now abandoned.

BACKGROUND OF THE INVENTION

1. Field of the Invention

The present invention relates to a data management system for managing digital data, and in particular to a system which can be applied to copyright management of copyrighted data, electronic commerce, and digital cash.

2. Background Art

As database systems store increasingly larger amount of information, database systems are becoming popular in which many computers, used to store various types of data independently, are connected via communication lines to share the data.

In such a database system, the information handled up to this point has been conventionally coded information that can be processed by a computer, and that contains a relatively small amount of information and monochrome binary data, such as facsimile information at most. And it was not possible to handle data containing a relatively large amount of information, such as data for natural pictures or animation. A technique is under development for digital processing of picture signals other than binary data which were handled only as analog signals in the past.

By digitizing the picture signal, it is possible to handle a picture signal, e.g., a television signal, by a computer. "Multimedia systems" is an emerging technology of the future capable of simultaneously handling the data handled by computers and digitized picture data.

Because picture data contains a much larger amount of information compared with character data and audio data, it is difficult to store or transfer or process the picture data by computer. For this reason, techniques for compressing or expanding picture data have been developed. Further, several standards for compression/expansion of picture data have been established. For example, the following standards have been established as common standards: JPEG point Photographic image coding Experts Group) standards for still pictures, H.261 standards for video conferences, MPEG1 (Moving Picture image coding Experts Group 1) standards for picture accumulation, and MPEG2 standards for current television broadcasting and high definition television broadcasting. These new techniques have made it possible to process digital picture data in real time.

For analog data, which has been widely used in the past, the control of copyrights during processing has not been an important issue because the quality of the analog data degrades each time the data is stored, copied, edited, or transferred. However, the quality of digital data does not degrade when the data is repeatedly stored, copied, edited, or transferred. Therefore, the management and control of copyrights during processing of digital data is an important issue.

In the past, there has been no adequate method for management and control of copyrights for digital data. It has been managed and controlled merely by copyright law or by contracts. In copyright law, only compensation for digital sound or picture recording devices has been prescribed.

It is possible not only to refer to the content of a database, but also to effectively utilize the data obtained from the database by storing, copying, or editing the data, and also transferring the edited data to the database with the edited data registered as new data. Further, it is possible to transfer edited data to other persons via an on-line means such as a communication link or via an off-line means such as a proper recording medium.

Conventional database system have dealt with only character data. However, in multimedia systems, sound data and picture data originally generated as analog data, are digitized and included in the database in addition to the other data in the database such as character data.

Under such circumstances, it is important to control copyrights of the data in the database. However, none of the prior art methods provides a complete copyright management and control for such operations as copying, editing, transferring, etc. of data.

In the past, computers have been used in relatively small scale for data communication. Computer communication system called "Internet" has shown a rapid progress in the past several years, and it is now being developed to a system closer and familiar to everybody. The information used in communication of this Internet system has been initially limited to character information only, but, with the progress of technique, audio data and picture data are now used. At present, even electronic commerce data or digital cash data, for which reliability and confidentiality are important factors, are now being used in the Internet system.

Under such circumstances, it has become necessary to establish new techniques to ensure and guarantee security to keep confidentiality and reliability of the processed data and also of the case where it is necessary to charge and collect fee.

In the information data, i.e. copyrighted data, for which fee is charged when utilizing such data, copyright is asserted in most cases, while there are information data such as personal mail, advertisement and propaganda data, etc., for which copyright is not positively asserted. For example, in case of a personal mail, for which copyright is not asserted, it is important to maintain privacy and to prevent falsification or forgery of the contents. Even in the data for advertisement and propaganda, which is usually not associated with assertion of copyright, damage or impairment may often occur due to falsification of the contents or business activities may be disturbed because of distribution of the data to the people other than those originally aimed or such trouble may be caused by false data.

As described above, it is essential in case of personal mail to stop falsification of contents, to prevent infringement of privacy and to exclude forgery. For the advertisement and propaganda data, it is necessary to prevent falsification of data contents, to restrict looking and to exclude forgery.

The prevention of infringement of privacy in the personal mail and the restriction of looking of the advertisement and propaganda data can be achieved by encryption of data. The prevention of forgery of the personal mail and the advertisement and propaganda data and the exclusion of falsification of the personal mail and the advertisement and propaganda data can be attained by confirmation (certification) of the sender or the transmitter of the data.

The Internet system is based on grass-roots concept and is a very fragile system as far as security of the system itself is concerned. Various systems for maintaining security of the Internet system have been proposed, and typical systems are PEM (Privacy Enhanced Mail) adopting hierarchical structure and PGP (Pretty Good Privacy) adopting horizontal distributed structure. These systems are effective to maintain confidentiality of data and to provide certification of the transmitting source, certification on non-falsification of the data, display of the first transmitter and control of public-key, while it is not possible by these systems to restrict re-utilization of data including data editing.

PEM, adopting hierarchical structure, comprises the most upper-level authority called IPRA (Internet PCA Registration Authority), a next upper-level authority called PCA (Policy Certification Authority), and the most lower-level authorities called Organizational, Residential and Personal respectively. Upper-level certification authorities issue a public-key certificate with digital signature on the data such as name of the lower-level authority for public-key of the lower-level authority, thus guaranteeing validity of the public-key.

PGP, adopting horizontal distributed structure, has no entity to correspond to the certification authority of PEM, and a reliable third person guarantees validity of the public-key by issuing a public-key certificate with digital signature to the data such as name of the public-key. In this PGP, there is a method called electronic fingerprinting to easily confirm the public-key. By this method, the public-key is hashed by one-way hash function such as MD 5 (Message Digest 5), and 16-byte hash value is confirmed by voice.

When PEM is compared with PGP, there is no problem on the certifier in PEM, which adopts hierarchical structure, but this is not necessarily a commonly used system in the Internet System, which is based on grass-roots concept. On the other hand, PGP is a simplified system, which can be widely used. However, this cannot be utilized in case there is no reliable person to sign.

With recent development of computer network system, individual computers, used on stand-alone basis in the past, are connected together through the network system, and database system to commonly share the data is now propagated. Further, distributed object system has been proposed, in which application program or basic software called operating system as well as data is also commonly shared through the network.

In the distributed object system, both data and software are supplied by a server as an object, which comprises program and data. In the distributed object system, there are two systems, i.e. a system called object container, in which operating system, application program and data are provided by a server and data processing and data storage are performed by a user terminal unit, which is an ordinary computer, and a system called server object, in which operating system, application program and data are provided by a server, and data processing is performed by a user terminal unit called network computer, while data storage is carried out by a server. The server object system is further developed to a system, in which data processing is also performed by the server, and the user terminal unit is provided only with input/output function, and the whole system functions as a single computer.

Another form of the network system called "license network" as rental network system, is considered. In this system, an enterprise providing network base such as communication lines also provides the systems other than communication lines such as fee charging system, security system, copyright management system, certification system, etc. And a service enterprise utilizes these services and carries out network business as if it is his own system.

SUMMARY OF THE INVENTION

In the present application, the inventor proposes a data management system for protecting copyright of digital data, for maintaining security in electronic commerce data and keeping security for digital cash data in an ordinary computer network system, a distributed object system and a license network system.

A first aspect of the data management system of the present invention comprises a data management center on a network, an original copyright owner or an information provider and a plurality of users who use the network. The data management center certifies public-key of network users, distributes secret-key for data encryption for presentation of a user label, and identifies data utilization status by the request of the secret-key. The data is stored and transferred after encrypted using the secret-key, and the data is to be stored and transferred by encryption using a secret-key different from the secret-key for the data which has been transferred. An original data label is added to original data, and an edit label is added to an edited data. The data management center does not store the data and stores only the original data label and the data relating to editing. A user label is used to request the secret key, but electronic fingerprinting of the user label may be used instead.

The second aspect of the data management system comprises a data management center on a network, an original copyright owner or an information provider and a plurality of users utilizing the network. The data management center certifies the public-key of the network users, and stores the original data and the editing scenario, and further stores the user label, the original data label and edit label. The data is not transferred between the users and the encrypted data label encrypted by the public-key is transferred. For transfer and for request of utilization, data label is used, while electronic fingerprinting of the data label may be used instead.

In electronic commerce system, every data is distributed through a mediator on a network, data which is transferred from a maker to a user is encrypted by by a secret-key for encryption, and data which is transferred from the user to the maker is encrypted by a secret-key for re-encryption.

BRIEF DESCRIPTION OF THE DRAWINGS

FIG. 1A to FIG. 1D each represents a drawing for explaining labels.

DETAILED DESCRIPTION OF THE INVENTION

Figure 2A:
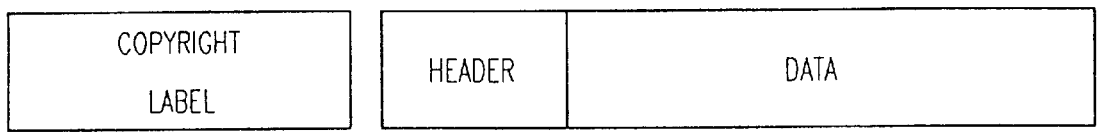
FIG. 2A to FIG. 2D each represents a drawing for explaining label, data header and data body.

The present invention is a digital data management system described with respect to copyright management. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The following explanation is provided to illustrate various embodiments of the invention.

Certifier

In the present invention, it is necessary to have an entity which certifies copyright owner of original copyrighted data, an information provider (IP) of the original copyrighted data and a user of the original copyrighted data, and another entity which certifies those who edit the original copyrighted data. There may be a single certifier or a plurality of certifiers. When there are a plurality of certifiers, they can be virtually considered as a single entity by linking them with each other.

In this system, a set of public-key and private-key of each user and a secret-key different for each step of the use of the copyrighted data are used. Among these keys, the private-key is managed under responsibility of each user and corresponding public-key is performed digital signature by the certifier, so that the reliability is maintained. The public-key is controlled by a key management center generally called key library, and is distributed at the request of the user. It is possible to link a certifier having a certifying function with the key management center or to make the certifier also have a function of the key management center.

Crypt Key

Brief description is given below on a key system and a digital signature system used in the invention.

Secret key system is also called "common key system" because the same key is used for encryption and decryption. Because it is necessary to keep the key in secret, it is also called "secret-key system". Typical examples of encryption algorithm that uses a secret-key are: DES (Data Encryption Standard) system of National Bureau of Standards, FEAL (Fast Encryption Algorithm) system of NTT, and MISTY system of Mitsubishi Electronic Corp. In the embodiments described below, the secret-key is referred as "Ks".

In contrast, the public-key system is a cryptosystem which uses a public-key being made public and a private-key which is maintained in secret to those other than the owner of the key. One key is used for encryption and the other key is used for decryption. Typical example is RSA public-key system. In the embodiments described below, the public-key is referred as "Kb", and the private-key is referred as "Kv".

Here, the operation to encrypt a data M as data material to a cryptogram Ck using a crypt key K is expressed as:

$$Ck=E(M, K)$$

and the operation to decrypt the cryptogram Ck to the data M using a crypt key K is expressed as:

$$M=D(Ck, K).$$

Digital signature is a technique that applied the public-key system. In this system, a transfer source turns the data M to a hash value Hm by one-way hash function such as MD 5. Using a private-key Kv, the hash value Hm is encrypted to Chmkv and is transferred together with the data M to a transfer destination. The transfer destination decrypts the transferred encrypted hash value Chmkv to the hash value Hm using the public-key Kb and also turns the transferred data M to a hash value Hm' using the same one-way hash function. If Hm=Hm', it is judged that the transferred data is reliable. The hash value Hm obtained in this process can be uniquely obtained from the data M, and it is not possible to uniquely reproduce the data M from the hash value Hm.

In case the transfer source and the transfer destination can confirm each other, the reliability of the transfer data is maintained even when the hash value Hm is transferred without encrypting. This is called electronic fingerprinting, and is used for simplified certification.

Use of Keys

In the embodiments from the first to fifth (described in detail below), encryption/decryption/re-encryption of data storing inhibition of data, and storing of crypt keys are performed in devices other than those in a center. It is desirable that these operations are operated by automatically working a unique application program, by an application program contained in data, or for attaining higher security by operating system. Even higher security can be provided by performing these processings by using IC card or PC card.

Charging

To ensure to charge and collect a fee corresponding to the use of data, two methods are used: to charge a fee corresponding to the expected use prior to actual use, and to charge a fee corresponding to actual result of use after the use.

The method to charge a fee after the use can be implemented by metering post-payment in which the use results are recorded and fee is charged by checking the record of use, or by card prepayment in which a card with an amount of purchase entered in advance on it is used to subtract the entered amount corresponding to the actual use.

Further, the metering post-payment method is divided into two methods to install a recording unit on server side like charging for telephone calls and to install a recording unit on user terminal like charging electric fees.

The card prepayment method is divided into two methods in which prepayment is stored on server side as a credit card; and the prepayment is stored on user side as a prepaid card.

Storing of Keys

In the first to fourth embodiments (described in detail below), based on user information presented by the user when the user registers utilization of the system, the data management center prepares a user label and transmits it to the user. The user stores the user label, and a user's public-key, a user's private-key and a public-key of the data management center which are used in the system, in the user's own device. The optimal place for this storage is an IC card or a PC card, while it is also possible to store in a data storage unit in the device. A manner of storing crypt keys by IC card or PC card can ensure the higher security than that of managing keys by operating system.

In the following, a description is given on a system to manage data copyrights. When there are digital data other than copyrighted data, requiring confidentiality, certainty and reliability of communication contents, dealing contents, etc. such as electronic commerce data or digital cash data, the present invention can also be applied to those digital data.

In the network system using crypt key, an entity to store the crypt key and an entity to generate the crypt key are placed out of the network system and are utilized via the network system. In the embodiment described below, it is supposed that a single entity, i.e. data management center, also serves as all of these entities.

Label

In the present invention, labels are used to protect copyright of the data and to execute data copyright. First, description will be given on the labels, referring to FIGS. 1, 2 and 3.

In this system, a user label of the system user is used. On the user label, information of the label owner is described as shown in FIG. 1A. If the label owner has the original copyright, information relating the original copyrighted data is added as shown in FIG. 1B. If the copyrighted data is an edited copyrighed data obtained by editing the original copyrighted data, information relating to the data of original copyright, information of edit tool and editing data (editing scenario) are further added as shown in FIG. 1C. It is also possible to add the edit tool (edition program) instead of the edit tool information as shown in FIG. 1D.

Among these labels, the label where only information of the label owner as shown in FIG. 1A is described is referred as "user label", and the label with information relating copyrighted data as shown in FIG. 1B is referred to as "copyright label", and the labels with information of the editing scenario is referred to as "edit label" as shown in FIG. 1C and FIG. 1D.

The user label is generated by the data management center according to the information of the user when the user joins the system. The copyright label is generated by the data management center when the author of the data presents the content to the data management center. The edit label is generated by the data management center, when the user who has edited the data presents the user label and the editing scenario to the data management center. These are transferred to each label owner and are stored at the data management center.

Encrypting

Figure 2B:
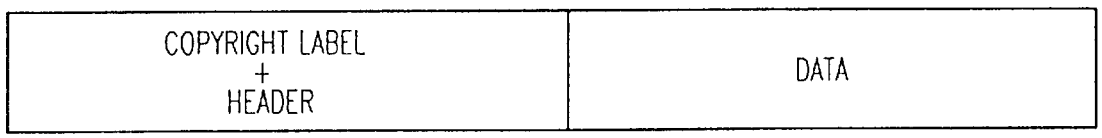
Figure 2C:
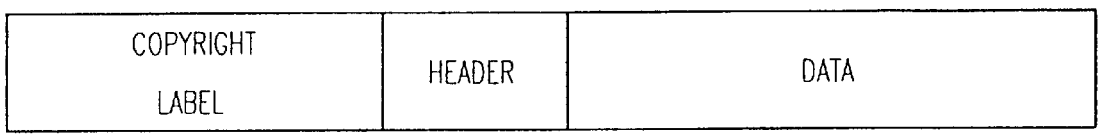

FIGS. 2A, 2B and 2C each represents relationship between copyright label and copyrighted data. In the copyright label and copyrighted data corresponding to the label, the copyright label is separated from header of the data as shown in FIG. 2A, or is integrated with header of the data as shown in FIG. 2B, or is attached to the header as shown in FIG. 2C.

Figure 2D:

If the copyright label is attached to the header, it is possible to have extended label arrangement, in which a plurality of copyright labels are combined together as shown in FIG. 2D. If the label is integrated as shown in FIG. 2B, the label may not be accommodated in a single header which is limited in capacity when the copyright label becomes larger. In the extended label arrangement of combining a plurality of labels as shown in FIG. 2D, if there are too many labels, it exceeds the limit of packet size on Internet, causing difficulty in distribution.

Figure 3A:
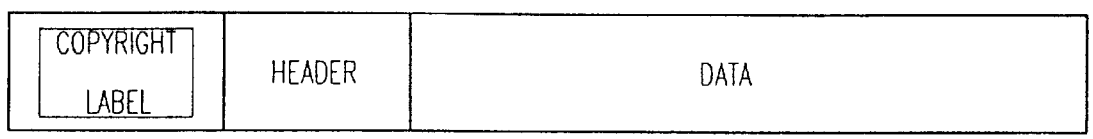
FIG. 3A to FIG. 3D each represents a drawing for explaining encryption of data and label.
Figure 3B:
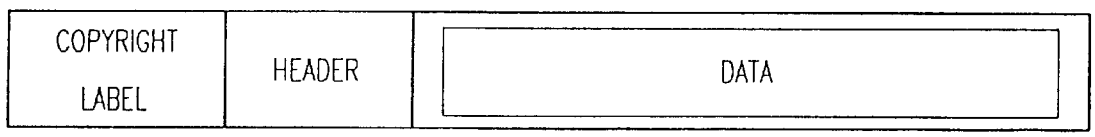

There are the following two cases: a case where the copyright label is encrypted and used as shown in FIG. 3A and a case where it is used without being encrypted as shown in FIG. 3B. In FIGS. 3A and 3B, square framed portions show being encrypted. If the copyright label is not encrypted, the data copyrighted is encrypted.

Figure 3C:
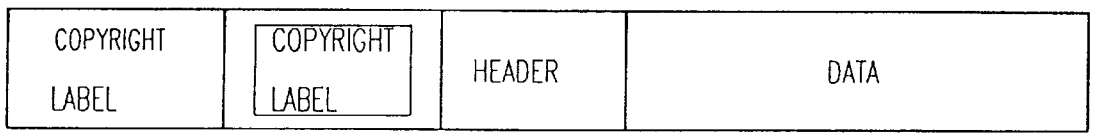
Figure 3D:

Even when the copyright label is not encrypted, the copyright labels other than the finally added copyright label are encrypted in the extended label arrangement as shown in FIG. 2D and a multi-stage arrangement can be adopted, in which crypt key of the copyright labels added previously and encrypted is included in the copyright label added later as shown in FIG. 3C and FIG. 3D. By this arrangement, it is possible to confirm the content of the previously added copyright labels.

Data is encrypted and decrypted to protect the copyright, but encryption and decryption are tasks can put much burden on computers. If the data to be encrypted or decrypted is a text data mainly composed of characters, the burden of encryption and decryption is not so much, but if the data to be encrypted or decrypted is audio data or video data, especially moving picture data, the burden of encryption and decryption may be enormous. For this reason, even when high speed crypt algorithm is used, at present it is not practical to encrypt or decrypt in software the data other than text data i.e., moving picture data in real-time since it requires special type computer such as super-parallel type super-computer rather than generally used personal computers.

A description is now given on an arrangement of encryption and decryption of data referring to FIGS. 4A, 4B, 4C, 4D, 4E, 4F and 4G. In these figures, square framed portions are the portions to be encrypted.

Figure 4A:
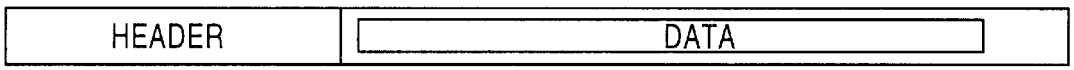
FIG. 4A to FIG. 4G each represents a drawing for explaining encryption of data header and data body.

FIG. 4A shows a method to use encryption in principle. Only data body, overwhelmingly larger compared with a header portion, is encrypted, and the data header to be used to recognize the data is not encrypted. In this arrangement, the burden of encryption and decryption is very high.

Figure 4B:
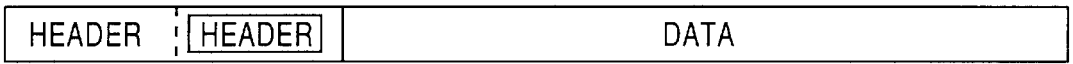

In contrast, there is a method to encrypt the data header portion without encrypting the data body portion as shown in FIG. 4B. In this case, if the entire header is encrypted, the data cannot be recognized. Hence, a part of the header is not encrypted.

Figure 4C:
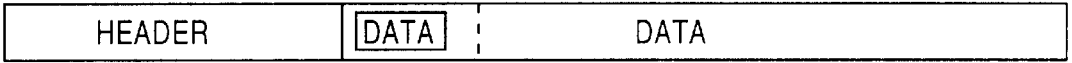

In order to reduce the burden in the arrangement of FIG. 4A, only the forward portion of the data body can be encrypted as shown in FIG. 4C. In this arrangement, it is only a part of the data body which must be encrypted or decrypted, and the burden of encryption and decryption is extremely reduced.

Figure 4D:

FIG. 4D shows the case where the effect by the arrangement of FIG. 4C is increased more, and a plurality of encrypted portions of the data body are provided in the data body.

Figure 4E:
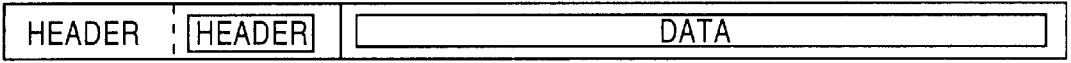

FIG. 4E shows a method called SKIP (Simple Key-management for Internet Protocols). Here, data body is encrypted, and a part of the header is encrypted, whereby a crypt key for decrypting the data body is placed in the encrypted portion in the header. In this arrangement, it is extremely difficult to cryptanalyze because two pieces of cryption must be decrypted.

Figure 4F:

However, in the arrangement shown in FIG. 4E, the entire data body is encrypted, and the burden of encryption and decryption is very high as in the case of the arrangement shown in FIG. 4A. If the arrangement of FIG. 4E is combined together with the arrangement of FIG. 4C and only the forward portion of the data body is encrypted as shown in FIG. 4F, the burden of encryption and decryption is extremely reduced because it is necessary to encrypt or decrypt only a part of the data body.

Figure 4G:

In the arrangement of FIG. 4E, if a plurality of encrypted portions are provided in the data body as shown in FIG. 4G by combining with the arrangement of FIG. 4D, the effect is increased more.

Figure 5A:
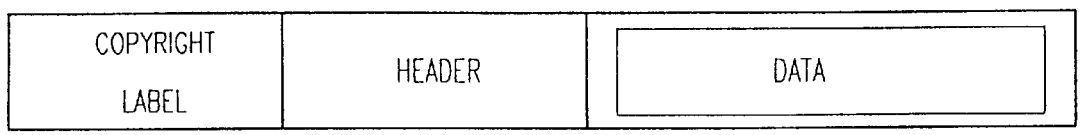
FIG. 5A to FIG. 5C each represents a drawing for explaining encryption of label, data header and data body.
Figure 5B:
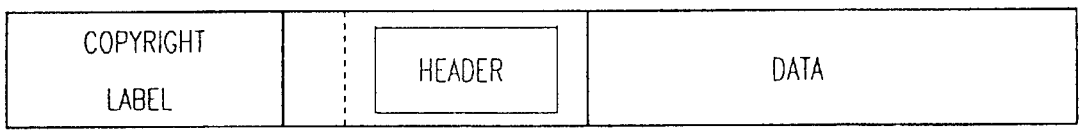
Figure 5C:
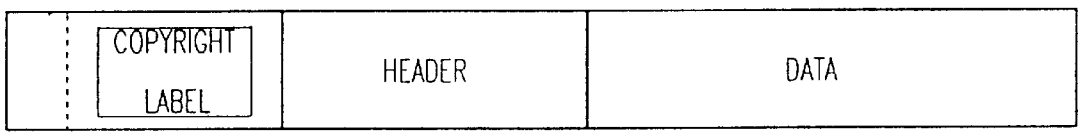

A description regarding an encryption/decryption structure of data having general file form is provided referring to FIGS. 5A, 5B and 5C. In these figures, square framed portions are to be encrypted.

Data having a general file form consists of data body portion and data header portion, and further, copyright label connecting therewith or relating thereto, according to the present invention. FIG. 5A shows a method to use cryption in principle. Only data body is encrypted, and data label and data header are not encrypted, and similar to the arrangement of FIG. 4A, the burden of encryption and decryption is very high.

In contrast, there is a method to encrypt the data header portion without encrypting the data body portion as shown in FIG. 5B. In this case, if the entire header is encrypted, the data cannot be recognized. Hence, a part of the header is not encrypted. In this case, the copyright label also is not encrypted.

There is another method to encrypt the copyright label without encrypting the data body and data header portions as shown in FIG. 5C. In this case also, if the entire copyright label is encrypted, the relation to data which corresponds to the copyright label cannot be recognized. Hence, a part of the copyright label is not encrypted.

Further, there is a method of so-called object oriented programming performing various processings by using "object" integrated with data and program handling data, instead of a general form file consisting of data header and data body.

Figure 6A:
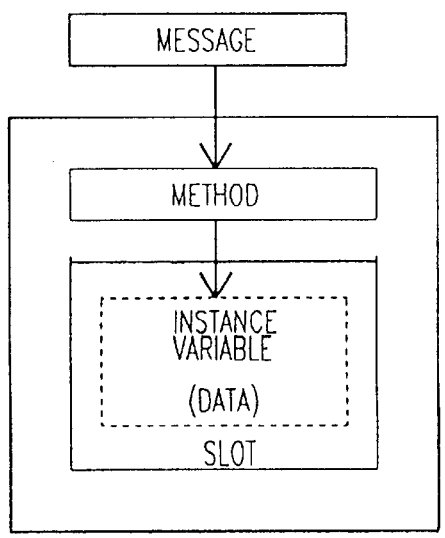
FIG. 6A and FIG. 6B each represents a drawing for explaining encryption of object file.

The object has basic conceptual structure as shown in FIG. 6A. A storing portion referred to as "slot" in an envelope referred to as "instance" accomodates data called "instance variable". The slot is surrounded by one or more of procedures called "method" for referring, processing, binding and so on, and the instance variable can be referred to or operated only via "method". This function is called "encapsulation". Instruction from outside for make the "method" refer to or operate the instance variable is called "message".

Figure 6B:
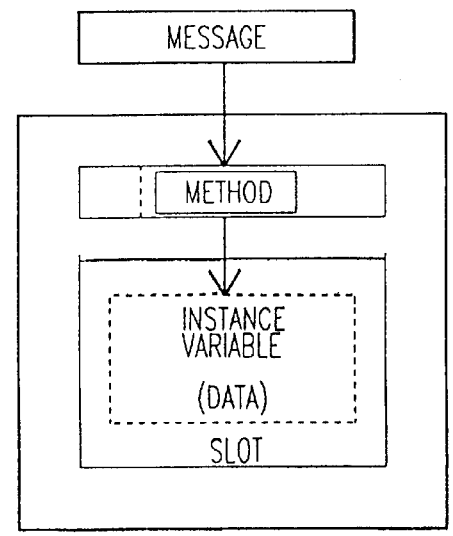

This means, in another view, the instance variable which is impossible to be referred to or operated without through "method" is protected by the "method". Then, this can be used for encrypting the "method" and allowing the instance variable to be referred to or operated only by "message" which can decrypt the encrypted "method" as shown in FIG. 6B. In this case also, similarly to the case of data having general file form in FIG. 5C, since if entire "method" is encrypted, it is impossible to utilize "object", a part of the "method" is not encrypted. In FIG. 6B, square framed portion is encrypted.

[Embodiment 1]

Figure 7:
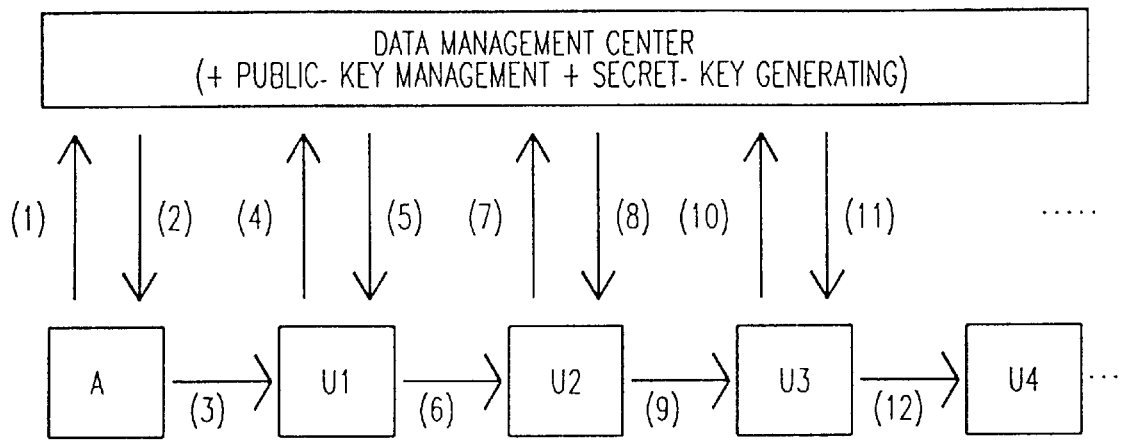
FIG. 7 represents a conceptional structure of a data management system of a first embodiment of the present invention.

A description is given on a first embodiment referring to FIG. 7. To explain the principle, description is given first on a case where the user transfers original copyrighted data to the next user without editing it. The case where the user edits the original copyrighted data is described later.

Practically, the case where the original copyrighted data is not edited is combined with the case where the original copyrighted data is edited, and carried out as explained in the third embodiment (described below). In the system of the present embodiment, secret-key and public-key and private-key are used. Therefore, an entity to manage public-key and an entity to generate secret-key may be linked to or included in the data management center.

(1) An original author (data owner) A presents an original copyright label L0 and requests the data management center Cd to distribute an original secret-key Ks0. The original author may transfer or deposit the original copyrighted data to an information provider (IP) or to database so that the information provider or the database can play a role of the original author.

It is also possible that the original author A stores the original secret-key Ks0 and encrypts the original copyrighted data M0 without depending on the data management center Cd, while the original secret-key Ks0 must be stored at the data management center Cd to utilize the original copyrighted data M0 by the user (data user).

(2) When the distribution of the original secret-key Ks0 is requested, the data management center Cd encrypts the original secret-key Ks0 corresponding to the original copyright label L0 using a public-key Kba of the original author A:

$$Cks0kba = E(Ks0, Kba)$$

and distributes the encrypted original secret-key Cks0kba together with the original copyright label L0 to the original author A. The secret-key is hereafter, encrypted by a public-key of a distributed destination in order to be decrypted only by the distributed destination.

In this case, the data management center Cd performs one-way hash on the original copyright label L0 using algorithm such as MD 5 and prepares an original copyright label fingerprint F0, e.g. the one having 16-byte data, and distributes it to the original author A. Thereafter, this electronic fingerprint is transferred together with the copyrighted data.

(3) When the encrypted original secret-key Cks0kba is distributed, the original author A decrypts the encrypted original secret-key Cks0kba using the private-key Kva of the original author A:

$$Ks0 = D(Cks0kba, Kva),$$

encrypts the original copyrighted data M0 using the decrypted original secret-key Ks0:

$$Cm0ks0 = E(M0, Ks0),$$

and transfers the encrypted original copyrighted data Cm0ks0, the original copyright label L0 and the original copyright label fingerprinting F0 to a first user U1.

(4) When the encrypted original copyrighted data Cm0ks0, the original copyright label L0 and the original copyright label fingerprint F0 are transferred, the first user U1 presents the original copyright label L0, the original copyright label fingerprint F0 and first user label Lu1, and requests the data management center Cd to distribute the original secret-key Ks0 and a first secret-key Ks1.

(5) When requested to distribute the original secret-key Ks0 and the first secret-key Ks1, the data management center Cd confirms validity of the presented original copyright label L0 by the original copyright label fingerprint F0, and registers the first user label Lu1. At the same time, the original secret-key Ks0 corresponding to the original copyright label L0 and the first secret-key Ks1 corresponding to the first user label Lu1 are encrypted using public-key Kb1 of the first user U1:

$$Cks0kb1 = E(Ks0, Kb1)$$

$$Cks1kb1 = E(Ks1, Kb1)$$

and distributes the encrypted original secret-key Csk0kb1 and the encrypted first secret-key Cks1kb1 to the first user U1.

(6) When the encrypted original secret-key Csk0ksb1 and the encrypted first secret-key Cks1kb1 are distributed, the first user U1 decrypts the encrypted original secret-key Ck0kb1 and the encrypted first secret-key Cks1kb1 using private-key Kv1 of the first user U1:

$$Ks0=D(Csk0kb1, Kv1)$$

$$Ks1=D(Cks1kb1, Kv1).$$

Then, the encrypted original copyrighted data Cm0ks0 is decrypted using the decrypted original secret-key Ks0:

$$M0=D(Cm0ks0, Ks0)$$

and the decrypted original copyrighted data M0 is utilized.

In case the original copyrighted data M0 is stored or copied, it is encrypted using the decrypted first secret-key Ks1:

$$Cm0ks1=E(M0, Ks1).$$

This is stored or copied as the encrypted original copyrighted data Cm0ks1. In case the original copyrighted data M0 is to be transferred to a second user (next data user) U2, it is encrypted using the decrypted first secret-key Ks1 and is transferred together with the original copyright label L0, the original copyright label fingerprint F0 and the first user label Lu1, as the encrypted original copyrighted data Cm0ks1.

Each user may put digital signature which one-way hash value of the user's label is encrypted using user's private-key on the user's label to be presented to the data management center Cd. Then, the data management center decrypts the encrypted one-way hash value using the user's public-key, calculates the one-way hash value of the label and compares the two one-way hash values in order to verify validity of each user's label.

(7) When the encrypted original copyrighted data Cm0ks1, the original copyright label L0, the original copyright label fingerprint F0 and the first user label Lu1 are transferred, the second user U2 presents the original copyright label L0, the original copyright label fingerprint F0, the first user label Lu1 and the second user label Lu2, and requests the data management center Cd to distribute the first secret-key Ks1 and second secret-key Ks2.

(8) When requested to distribute the first secret-key Ks1 and the second secret-key Ks2, the data management center Cd confirms validity of the original copyright label L0 and the first user label Lu1 by the original copyright label fingerprint F0.

When it is confirmed that the first user label Lu1 is valid, the data management center Cd registers the second user label Lu2 and encrypts the first secret-key Ks1 corresponding to the first user label Lu1 and the second secret-key Ks2 corresponding to the second user label Lu2 using public-key Kb2 of the second user U2:

$$Cks1kb2=E(Ks1, Kb2)$$

$$Cks2kb2=E(Ks2, Kb2)$$

and distributes the encrypted first secret-key Cks1kb2 and the encrypted second secret-key Cks2kb2 to the second user U2.

(9) When the encrypted first secret-key Cks1kb2 and the encrypted second secret-key Cks2kb2 are distributed, the second user U2 decrypts the encrypted first secret-key Cks1kb2 and the encrypted second secret-key Cks2kb2 using private-key Kv2 of the second user U2:

$$Ks1=D(Cks1kb2, Kv2)$$

$$Ks2=D(Cks2kb2, Kv2),$$

decrypts the encrypted original copyrighted data Cm0ks1 using the decrypted first secret-key Ks1:

$$M0=D(Cm0ks1, Ks1)$$

and utilizes the decrypted original copyrighted data M0.

If the original copyrighted data M0 is to be stored or copied, it is encrypted using the decrypted second secret-key Ks2, and the encrypted original copyrighted data Cm0ks2 is stored or copied. If the original copyrighted data M0 is to be transferred to a third user U3, it is encrypted using the decrypted second secret-key Ks2, and the encrypted original copyrighted data Cm0ks2 is transferred to the third user U3 together with the original copyright label L0, the original copyright label fingerprint F0, the first user label Lu1, and the second user label Lu2.

(10) When the encrypted original copyrighted data Cm0ks2 is transferred together with the original copyright label L0, the original copyright label fingerprint F0, the first user label Lu1, and the second user label Lu2, the third user U3 presents the original copyright label L0, the original copyright label fingerprint F0, the first user label Lu1, the second user label Lu2 and third user label Lu3, and requests the data management center Cd to distribute the second secret-key Ks2 and third secret-key Ks3.

(11) When requested to distribute the second secret-key Ks2 and the third secret-key Ks3, the data management center Cd confirms whether the original copyright label L0, the first user label Lu1 and the second user label Lu2 are valid or not, using the original copyright label fingerprint F0.

When it is confirmed that the second user label Lu2 is valid, the data management center Cd registers the third user label Lu3 and encrypts the second secret-key Ks2 corresponding to the second user label Lu2 and third secret-key Ks3 corresponding to the third user label Lu3 using public-key Kb3 of the third user U3:

$$Cks2kb3=E(Ks2, Kb3)$$

$$Cks3kb3=E(Ks3, Kb3).$$

Then, the encrypted second secret-key Cks2kb3 and the encrypted third secret-key Cks3kb3 are distributed to the third user U3.

(12) When the encrypted second secret-key Cks2kb3 and the encrypted third secret-key Cks3kb3 are distributed, the third user U3 decrypts the encrypted second secret-key Cks2kb3 and the encrypted third secret-key Cks3kb3 using private-key Kv3 of the third user U3:

$$Ks2=D(Cks2kb3, Kv3)$$

$$Ks3=D(Cks3kb3, Kv3)$$

and decrypts the encrypted original copyrighted data Cm0ks2 using the decrypted second secret-key Ks2:

$$M0=D(Cm0ks2, Ks2),$$

thus utilizes the decrypted original copyrighted data M0.

If the original copyrighted data M0 is to be stored or copied, it is encrypted using the decrypted third secret-key Ks3, and the encrypted original copyrighted data Cm0ks3 is stored or copied. If the original copyrighted data M0 is to be transferred to a fourth user U4, it is encrypted using the decrypted third secret-key Ks3, and encrypted original copyrighted data Cm0ks3 is transferred to the fourth user U4 together with the original copyright label L0, the first user label Lu1, the second user label Lu2 and the third user label Lu3. Then, the same operation is repeated.

[Embodiment 2]

Figure 8:
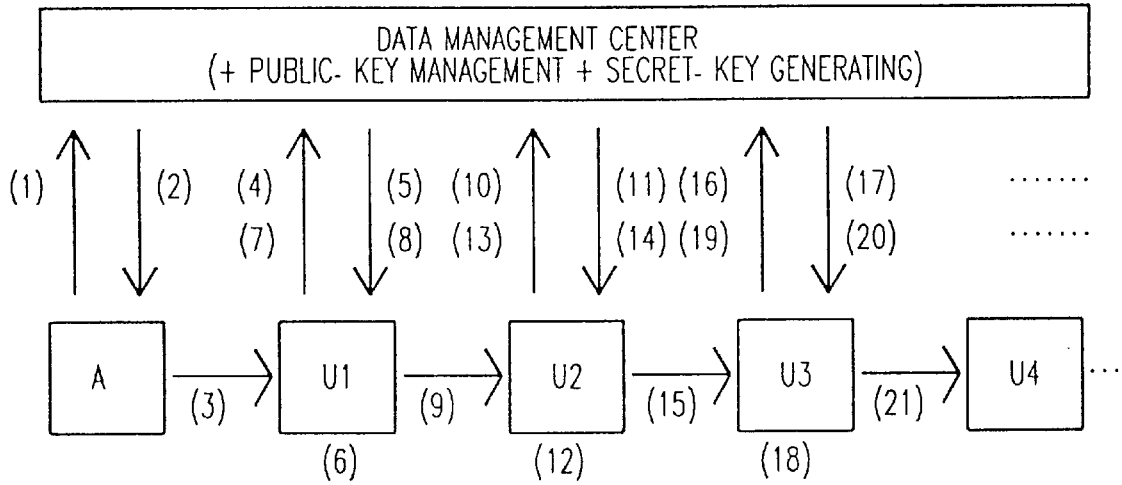
FIG. 8 represents a conceptional structure of a data management system of a second embodiment of the present invention.

A description is provided below on a second embodiment, in which the key used to encrypt the copyrighted data is sent separately from the key used for decrypting the copyrighted data, referring to FIG. 8.

In the second embodiment, handling of keys, relation-ship between the original author, the information provider and the users as well as handling of labels are the same as in the first embodiment, and detailed description is not given here.

(1) The original author A presents the original copyright label L0 and requests the data management center Cd to distribute original secret-key Ks0.

(2) When requested to distribute the original secret-key Ks0, the data management center Cd prepares an original copyright label fingerprint F0 from the original copyright label L0, and encrypts the original secret-key Ks0 corresponding to the original copyright label L0 using public-key of the original author A:

$$Cks0kba=E(Ks0, Kba),$$

and distributes the encrypted original secret-key Cks0kba together with the original copyright label L0 to the original author A.

(3) When the encrypted original secret-key Cks0kba is distributed, the original author A decrypts the encrypted original secret-key Cks0kba using private-key Kva of the original author A:

$$Ks0=D(Cks0kba, Kva)$$

and encrypts the original copyrighted data M0 using the decrypted original secret-key Ks0:

$$Cm0ks0=E(M0, Ks0).$$

Then, the encrypted original copyrighted data Cm0ks0, the original copyright label L0 and the original copyright label fingerprint F0 are transferred to the first user U1.

(4) When the encrypted original copyrighted data Cm0ks0, the original copyright label L0 and the original copyright label fingerprint F0 are transferred, the first user U1 presents the original copyright label L0 and the original copyright label fingerprint F0 and first user label Lu1 and requests the data management center Cd to distribute the original secret-key Ks0.

(5) When requested to distribute the original secret-key Ks0, the data management center Cd confirms validity of the presented original copyright label L0 using the original copyright label fingerprint F0 and registers the first user label Lu1. At the same time, the original secret-key Ks0 corresponding to the original copyright label L0 is encrypted using public-key Kb1 of the first user U1:

$$Csk0kb1=E(Ks0, Kb1)$$

and the encrypted original secret-key Csk0kb1 is distributed to the first user U1.

(6) When the encrypted original secret-key Csk0kb1 is distributed, the first user U1 decrypts the encrypted original secret-key Ck0kb1 using private-key Kv1 of the first user U1:

$$Ks0=D(Csk0kb1, Kv1),$$

decrypts the encrypted original copyrighted data Cm0ks0 using the decrypted original secret-key Ks0:

$$M0=D(Cm0ks0, Ks0),$$

and utilizes the decrypted original copyrighted data M0.

(7) In case the original copyrighted data M0 is to be stored or copied, the original copyright label L0 and the original copyright label fingerprint F0, and the first user label Lu1 are presented again, and the distribution of the first secret-key Ks1 is requested to the data management center Cd.

(8) When requested to distribute the first secret-key Ks1, the data management center Cd confirms validity of the presented first user label Lu1 using the original copyright label fingerprint F0, and encrypts the first secret-key Ks1 corresponding to the registered first user label Lu1 using public-key Kb1 of the first user U1:

$$Cks1kb1=E(Ks1, Kb1)$$

and distributes the encrypted first secret-key Cks1kb1 to the first user U1.

(9) When the encrypted first secret-key Cks1kb1 is distributed, the first user U1 decrypts the encrypted first secret-key Cks1kb1 using private-key Kv1 of the first user U1:

$$Ks1=D(Csk1kb1, Kv1)$$

and encrypts the original copyrighted data M0 using the decrypted first secret-key Ks1:

$$Cm0ks1=E(M0, Ks1)$$

Then, the encrypted original copyrighted data Cm0ks1 is stored or copied. In case the original copyrighted data M0 is to be transferred to the second user U2, it is encrypted using the decrypted first secret-key Ks1, and the encrypted original copyrighted data Cm0ks1 is transferred together with the original copyright label L0, the original copyright label fingerprint F0, and the first user label Lu1.

(10) When the encrypted original copyrighted data Cm0ks1, the original copyright label L0, the original copyright label fingerprint F0 and the first user label Lu1 are transferred, the second user U2 presents the original copyright label L0, the original copyright label fingerprint F0, the first user label Lu1, and the second user label Lu2, and requests the data management center Cd to distribute the first secret-key Ks1.

(11) When requested to distribute the first secret-key Ks1, the data management center Cd confirms validity of the original copyright label L0 and the first user label Lu1 using the original copyright label fingerprint F0.

When it is confirmed that the first user label Lu1 is valid, the data management center Cd registers the second user label Lu2, encrypts the first secret-key Ks1 corresponding to the first user label Lu1 using public-key Kb2 of the second user:

$$Cks1kb2=E(Ks1, Kb2)$$

and distributes the encrypted first secret-key Cks1kb2 to the second user U2.

(12) When the encrypted first secret-key Cks1kb2 is distributed, the second user U2 decrypts the encrypted first secret-key Cks1kb2 using private-key Kv2 of the second user U2:

$$Ks1=D(Cks1kb2, Kv2),$$

decrypts the encrypted original copyrighted data Cm0ks1 using the decrypted first secret-key Ks1:

$$M0=D(Cm0ks1, Ks1)$$

and utilizes the decrypted original copyrighted data M0.

(13) In case the original copyrighted data M0 is to be stored or copied, the original copyright label L0, the original copyright label fingerprint F0, the first user label Lu1 and the second user label Lu2 are presented again, and the distribution of second secret-key Ks2 is requested to the data management center Cd.

(14) When requested to distribute the second secret-key Ks2, the data management center Cd confirms validity of the presented second user label Lu2 using the original copyright label fingerprint F0, encrypts the second secret-key Ks2 corresponding to the registered second user label Lu2 using public-key Kb2 of the second secret-key Ks2:

$$Cks2kb2=E(Ks2, Kb2)$$

and distributes the encrypted second secret-key Cks2kb2 to the second user U2.

(15) When the encrypted second secret-key Ckskb2 is distributed, the second user U2 decrypts the encrypted second secret-key Cks2kb2 using private-key Kv2 of the second user U2:

$$Ks2=D(Cks2kb2, Kv2),$$

encrypts the original copyrighted data M0 using the decrypted second secret-key Ks2:

$$Cm0ks2=E(M0, Ks2),$$

and stores or copies it as the encrypted original copyrighted data Cm0ks2. In case the original copyrighted data M0 is to be transferred to the third user U3, it is encrypted using the decrypted second secret-key Ks2, and transfers it as the encrypted original copyrighted data Cm0ks2 together with the original copyright label L0, the original copyright label fingerprint F0, the first user label Lu1, and the second user label Lu2 to the third user U3.

(16) When the encrypted original copyrighted data Cm0ks2 is transferred together with the original copyright label L0, the original copyright label fingerprint F0, the first user label Lu1 and the second user label. Lu2, the third user U3 presents the original copyright label L0, the original copyright label fingerprint F0, the first user label Lu1, the second user label Lu2 and the third user label Lu3 and requests the data management center Cd to distribute the second secret-key Ks2.

(17) When requested to distribute the second secret-key Ks2, the data management center Cd confirms whether the original copyright label L0, the first user label Lu1 and the second user label Lu2 are valid or not using the original copyright label fingerprint F0.

When it is confirmed that the second user label Lu2 is valid, the data management center Cd registers the third user label Lu3, encrypts the second secret-key Ks2 corresponding to the second user label Lu2 using public-key Kb3 of the third user U3:

$$Cks2kb3=E(Ks2, Kb3)$$

and distributes the encrypted second secret-key Cks2kb3 to the third user U3.

(18) When the encrypted second secret-key Cks2kb3 is distributed, the third user U3 decrypts the encrypted second secret-key Cks2kb3 using private-key Kv3 of the third user U3:

$$Ks2=D(Cks2kb3, Kv3),$$

decrypts the encrypted original copyrighted data Cm0ks2 using the decrypted second secret-key Ks2:

$$M0=D(Cm0ks2, Ks2)$$

and utilizes the decrypted original copyrighted data M0.

(19) In case the original copyrighted data M0 is stored and copied, the original copyright label L0, the original copyright label fingerprint F0, the first user label Lu1, the second user label Lu2 and the third user label Lu3 are presented again, and the distribution of the third secret-key Ks3 is requested to the data management center Cd.

(20) When requested to distribute the third secret-key Ks3, the data management center Cd confirms validity of the presented third user label Lu3 using the original copyright label fingerprint F0. The third secret-key Ks3 corresponding to the registered third user label Lu3 is encrypted using public-key Kb3 of the third user U3:

$$Cks3kb3=E(Ks3, Kb3)$$

and the encrypted third secret-key Cks3kb3 is distributed to the third user U3.

(21) When the encrypted third secret-key Cks3kb3 is distributed, the third user U3 decrypts the encrypted third secret-key Cks3kb3 using private-key Kv3 of the third user U3:

$$Ks3=K(Cks3kb3, Kv3),$$

encrypts the original copyrighted data M0 using the decrypted third secret-key ks3:

$$Cm0ks3=E(M0, Ks3),$$

and stores and copies it as the encrypted original copyrighted data Cm0ks3. In case the original copyrighted data M0 is transferred to the fourth user U4, it is encrypted using the decrypted third secret-key Ks3 and transfers it to the fourth user as the encrypted original copyrighted data Cm0ks3 together with the original copyright label L0, the original copyright label fingerprint F0, the first user label Lu1, the second user label Lu2, and the third user label Lu3. Then, the same operation is repeated.

In the above-mentioned embodiment, only the keys for decryption necessary for utilization of the copyrighted data are distributed at first. Accordingly, the operation is simplified for the user, who does not store, copy or transfer the copyrighted data.

It is also possible to simultaneously provide two systems so that the two systems can be adequately selected and utilized, i.e. a system where the keys for re-encryption is distributed at the same time as the keys for decryption as in the first embodiment, and a system where keys for re-encryption are separately distributed from those for decryption as in the second embodiment.

[Embodiment 3]

A description is provided below on a third embodiment where the user edits an original copyrighted data and transfers it to the next user, referring to FIG. 9 and FIG. 10.

The edit processing of the copyrighted data is performed by editing the original copyrighted data using a edit tool, which is an application program. The data of the edited copyrighted data obtained by editing can be expressed by data of the utilized original copyrighted data, the information of the used edit tool and the editing process data. Specifically, in case the edit tool is available, it is possible to reproduce the data of the edited copyrighted data by obtaining the original copyrighted data and the editing process data.

A description on editing digital data is provided below.

Because data is edited by using an edition program (edit tool) and thereby altering original data, edited data can be reproduced as the original data, edit tool and editing process data (editing scenario) are specified. In other words, unless the original data, edit tool and the editing scenario are specified, it is impossible to reproduce the edited data.

To produce new data from single original data, there are a case in which edited data {A'} is obtained by altering original data A; a case in which edited data {A+X} is obtained by adding data X to the original data A by a user; a case in which edited data {A"} is obtained by dividing the original data A into original data elements A1, A2, A3, . . . and changing the arrangement of the elements to such as A3, A2 and A1; and a case in which edited data {A1+X1+A2+ X2+A3+X3 . . . } is obtained by dividing the original data A into original data elements A1, A2, A3, . . . , also dividing the data X of the user into X1, X2, X3, . . . and arranging these elements.

In these cases, alteration of original data, change of original data arrangement, combination of the original data with user data, and division of the original data and combination of it with the user data arise respectively a secondary exploitation right as a secondary copyright, which is necessary to be protected. The original copyright of the user, of course, exists in the data X added by the user.

To produce new data by combining a plurality of original data, there are a case in which edited data {A+B+C . . . } is obtained by simply combining original data A, B, C, . . . ; a case in which edited data such as {A+X} is obtained by adding data X to the original data A, B, C, . . . ; a case in which edited data {A1+B1+C1+ . . . +A2+B2+C2+ . . . +A3+B3+C3+ . . . } is obtained by dividing the original data A, B, C, . . . into original data elements A1, A2, A3, . . . , B1, B2, B3 . . . , and C1, C2, C3 . . . , combining them, and changing their arrangements; and a case in which edited data {A1+B1+C1+X1+ . . . +A2+B2+C2+X2+ . . . +A3+B3+ C3+X3+ . . . } is obtained by dividing the original data A, B, C, . . . into original data elements A1, A2, A3, . . . , B1, B2, B3, . . . , and C1, C2, C3 . . . , combining with the elements of user data X1, X2, X3, . . . , and changing their arrangements.

Also in these cases, combination of a plurality of original data, combination of a plurality of original data with user data, division of a plurality of original data and change of the arrangements, and combination of divided plurality of original data with the user data arise respectively a secondary exploitation right as a secondary copyright, which is necessary to be protected. Also, the original copyright of the user, of course, exists in the data X1, X2, X3, . . . added by the user.

Figure 9:
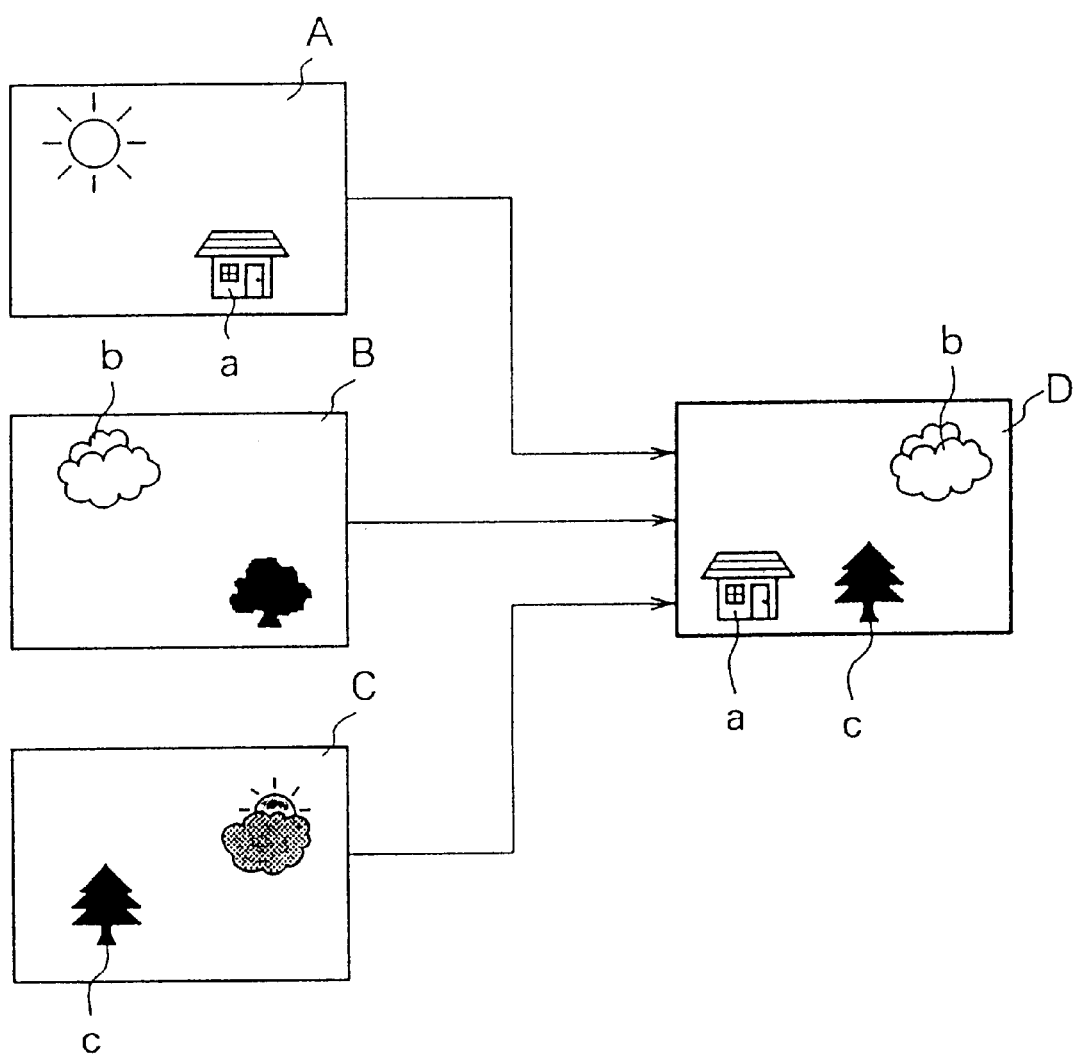
FIG. 9 is to explain a technique to generate a data from a plurality of data.

FIG. 9 shows an example for producing new data D by using a plurality of original data A, B and C. This method is known as the cut-and-paste technique in which data is edited by extracting (cutting out) elements "a", "b" and "c" from original data A, B and C and attaching (pasting) the extracted elements "a", "b" and "c" to form a piece of data D.

Further, there is a data linkage technique which links a plurality of data objects. In this data linkage technique, object linkage part is arranged in "slot" of data object referred to as "pad". The "pad" is linked with other "pad" by the "slot", the operation of which is called "slot connection" so that the objects are linked with each other.

Inter-relationship of a plurality of objects linked in this way is represented by a tree structure, and thus represented tree structure can be used for deletion or addition of the object.

While it is clear that original data and user data are data, the editing process: alteration of original data, arrangement change of original data, combination of original data with user data, division of original data and combination with user data, combination of a plurality of original data each other, combination of a plurality of original data with user data, division and arrangement change of a plurality of original data, and combination of divided plurality of original data with user data, are also data.

When noticing that editing scenario of data, such as arrangement of original data and process of editing, is also data, the secondary exploitation right on edited data can be protected by managing the user's copyright about data of editing process in addition to the original copyright of the author on the original data and the user's copyright on the user's data.

That is, it is possible to ensure to manage the copyrights of edited data as well as of original data, if it is regarded that the edited data is constituted of original data, user data and editing scenario, and thus, these original data, user data and editing scenario. In this case, the edition program used for editing data may be managed by the data management system of data copyrights, if necessary.

While the above data edition of original data can be performed by using an edition program corresponding to the original data, by handling the original data as object-oriented software which has recently been focused on, it is possible to facilitate further editing of data and manage more preferably copyrights of data. Moreover, by adopting agent-oriented software, a user can synthesize data with little labor.

The agent-oriented software, unlike the conventional one, is a program having autonomy, flexibility and cooperativeness, which is able to meet a user's request with its characteristics of autonomy, flexibility and cooperativeness in accordance with only a general instruction of the user without specifically giving every operation instruction to the software.

By incorporating the agent program into a basic system of a data copyright management system so that the database utilization of a user is monitored, and it is arranged that information including data utilization condition and charging is collected at the database or the copyright management center, using metering function placed in user terminal, and thus, it is possible to know the database utilization condition of the user at the database side or the copyright management center side and achieve more accurate copyright management. These agent program and its data are also necessary to be protected in copyrights, and therefore, are encrypted like original data.

Figure 10:
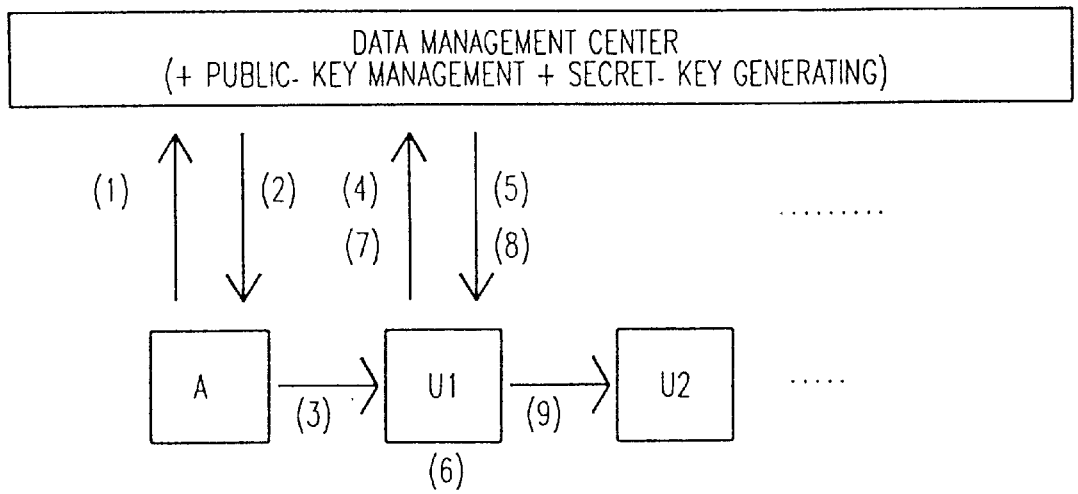
FIG. 10 represents a conceptional structure of a data management system of a third embodiment of the present invention.

In this third embodiment shown in FIG. 10, the copyright label in the first and the second embodiments already described added with the editing scenario is called "edit label", and this is treated in the same manner as the copyright label in the first embodiment.

The handling of keys, relationship between the original author, the information provider, and the user, as well as the handling of labels are the same as in the first embodiment, and detailed description is not given here.

(1) The original author A presents the original copyright label L0 and requests the data management center Cd to distribute original secret-key Ks0.

(2) When requested to distribute the original secret-key Ks0, the data management center Cd encrypts the original secret-key Ks0 corresponding to the original copyright label L0 using public-key Kba of the original author A:

$$Cks0kba = E(Ks0, Kba)$$

and distributes the encrypted original secret-key Cks0kba together with the original copyright label L0 to the original author A.

In this case, the data management center Cd performs one-way hash to the original copyright label L0 using algorithm such as MD 5, for example, to 16-byte data amount, prepares an original copyright label fingerprint F0, and distributes it to the original author A. This electronic fingerprint is prepared on each of the original copyrighted data and edited copyrighted data each time the original copyrighted data is edited and edited copyrighted data is obtained and is transferred, together with the copyrighted data.

(3) When the encrypted original secret-key Cks0kba is distributed, the original author A decrypts the encrypted original secret-key Cks0kba using private-key Kva of the original author A:

$$Ks0=D(Cks0kba, Kva),$$

encrypts the original copyrighted data M0 using the decrypted original secret-key Ks0:

$$Cm0ks0=E(M0, Ks0)$$

and transfers the encrypted original copyrighted data Cm0ks0, the original copyright label L0 and the original copyright label fingerprint F0 to the first user U1.

(4) When the encrypted original copyrighted data Cm0ks0, the original copyright label L0 and the original copyright label fingerprint F0 are transferred, the first user U1 presents the original copyright label L0, the original copyright label fingerprint F0 and first user label Lu1 and requests the data management center Cd to distribute the original secret-key Ks0.

(5) When requested to distribute the original secret-key ks0, the data management center Cd confirms validity of the presented original copyright label L0 using the original copyright label fingerprint F0 and registers the first user label Lu1. At the same time, the original secret-key Ks0 corresponding to the original copyright label L0 is encrypted using public-key Kb1 of the first user U1:

$$Csk0kb1=E(Ks0, Kb1)$$

and the encrypted original secret-key Csk0kb1 is distributed to the first user U1.

(6) When the encrypted original secret-key Csk0kb1 is distributed, the first user U1 decrypts the encrypted original secret-key Csk0kb1 using private-key Kv1 of the first user U1:

$$Ks0=D(Csk0kb1, Kv1),$$

decrypts the encrypted original copyrighted data Cm0ks0 using the decrypted original secret-key Ks0:

$$M0=D(Cm0ks0, Ks0),$$

and edits the decrypted original copyrighted data M0 using the edit tool and obtains edited copyrighted data Me1.

The edited copyrighted data Me1 thus obtained contains copyright of the first user, who edited the data, and also copyright of the original author who prepared the original copyrighted data.

The copyright of the original author relating to the original copyrighted data M0 can be protected by the original copyright label L0 which has been registered, original copyright label fingerprint F0 and the original secret-key Ks0 corresponding to the original copyright label L0 and also by the first user label Lu1 and the first secret-key Ks1 corresponding to the first user label Lu1. However, because no key for encrypting the edited copyrighted data Me1 is available, the secondary copyright of the first user relating to the edited copyrighted data Me1 is not yet protected.

(7) To protect the secondary copyright of the first user relating to the edited copyrighted data Me1, label of the first user, who is the author of the edited copyrighted data, and its electronic fingerprinting are used in the third embodiment.

As was already described, the edited copyrighted data can be expressed by data of the utilized original copyrighted data, information of the used edit tool and the editing scenario (editing process data). Accordingly, these informations and editing scenario are entered in the first user label, i.e. the first edit label Le1.

Further, to protect secondary exploitation right as the secondary copyright in subsequent distribution process, the user U1 presents the first edit label Le1 to the data management center Cd so that the secondary exploitation right of the user U1 is registered.

(8) When the first edit label Le1 is presented, the data management center Cd confirms validity of the presented original copyright label L0 using the original copyright label fingerprint F0 and registers the first edit label Le1. At the same time, the electronic fingerprint F1 of the first edit label Le1 is prepared, and first edit secret-key Kse1 corresponding to the first edit label Le1 is encrypted by public-key Kb1 of the first user U1 at the data management center:

$$Ckse1kb1=E(Kse1, Kb1),$$

and the encrypted first edit secret-key Ckse1kb1 is distributed to the first user U1 together with the electronic fingerprint Fe1 of the first edit label Le1.

(9) When the encrypted first edit secret-key Ckse1kb1 and the electronic fingerprint Fe1 of the first edit label Le1 are distributed, the first user U1 decrypts the encrypted first edit secret-key Ckse1kb1 using private-key Kv1 of the first user U1:

$$Kse1=D(Ckse1kb1, Kv1),$$

encrypts the first edited copyrighted data Me1 using the decrypted first edit secret-key Kse1:

$$Cme1kse1=E(Me1, Kse1)$$

and transfers the encrypted first edited copyrighted data Cme1kse1 to the second user U2 together with the first edit label Le1, and the electronic fingerprint Fe1 of the first edit label Le1. Then, the same operation is repeated.

In the third embodiment, only the first edit label Le1 and the electronic fingerprint Fe1 of the first edit label Le1 are transferred together with the encrypted first edited copyrighted data Cme1kse1 when edited data transfer, while it is possible to arrange in such manner that the other labels and electronic fingerprints can be simultaneously transferred.

In the editing by utilizing a plurality of copyrighted data as shown in FIG. 9, operation is complicated because there are a large numbers of copyrighted data and it can be carried out as in the editing process using a single data. Description is not given here to avoid lengthy explanation.

In the systems of the first, the second and the third embodiments described above, the copyrighted data is encrypted using secret-key, and the secret-key for its decryption and secret-key for re-encryption used for storage, copying and transfer are distributed by the data management center based on the user label presented by the user.

The secret-key for decryption and the secret-key for re-encryption are encrypted by the user public-key, whose validity have been certified by the data management center in advance. Thus, these secret-keys are indirectly certified by the data management center. Because these secret-keys are used to encrypt the copyrighted data to be transferred, the copyrighted data to be transferred consequently is also certified by the data management center.

Because certification by the data management center is of absolute nature, it is a hierarchical type certification system represented by PEM.

On the other hand, the copyrighted data itself is transferred between the users without being transferred to the data management center, and that might well be said that the certification carried out in this process is a horizontal distributed type certification system represented by PGP.

As described above, it is possible by the system of the embodiments to attain a certification system, which has high reliability of the hierarchical type certification system and easiness to handle of the horizontal distributed type certification system.

The behavior and content of behavior of the users who utilize the copyrighted data are all identified at the data management-center by the user labels presented by the users. The utilization including editing of the copyrighted data is carried out via the data management center. Thus, the identity of the user can be reliably confirmed. By confirming the contents and course of behavior, contents and history of the copyrighted data can be certified. If this certification of the contents is applied to the electronic commerce, it is possible to certify the contents of dealings by data management center, i.e. to perform "electronic notarization".

When digital signature is put on user label or on edit label, and if computer virus enters the user label or the edit label, the data of the label changes. As a result, hash value changes. Therefore, by verifying the digital signature, it is possible to detect intrusion of computer virus.

Even when digital signature is not given, if turning to hash value is performed, the user label or the edit label are made unavailable by the changed hash value, and intrusion of computer virus can be detected.

[Embodiment 3]

In case of distributed object system represented by license network system, the use of network computer to perform only input/output of data and data processing and not provided with data storage unit is adopted instead of conventional type computer, which possesses data storage unit of large capacity.

Further, the use of a network computer similar to a terminal unit of large size computer, having only input/output function of data and not provided with data processing unit is also considered. This network computer does not have data storage unit and cannot store or copy the copyrighted data.

Next, a description is given below on an embodiment, which can also be applied to a network computer not provided with data storage unit and used in the distributed object system. It is needless to say that this embodiment is also applicable to an ordinary computer provided with data storage unit.

To protect data copyright, it is necessary to use some sort of encryption technique to restrict unauthorized utilization of the copyrighted data. In the first, the second, and the third embodiments described above, to protect copyright in a system for an ordinary computer having data storage unit, encrypted copyrighted data and labels not encrypted as clues to utilize the copyrighted data are used.

In contrast, in a system for a network computer, which has only the function of the above-mentioned terminal unit, the copyrighted data is not stored, copied or transferred, and there is no need to encrypt the copyrighted data.

As already explained in the third embodiment, the editing of copyrighted data is performed by modifying the original copyrighted data using the edit tool, and data of the edited copyrighted data thus obtained can be expressed by the utilized original copyrighted data, information of the used edit tool and the editing scenario.

This is the same in the distributed object system. In case edited copyrighted data is produced by utilizing the copyrighted data in the database existing on the distributed object system, the edited copyrighted data can be reproduced by specifying the utilized database, the used original copyrighted data, information of the used edit tool and the editing scenario. The same applies to the case where a plurality of copyrighted data obtained from a single database or a plurality of databases are utilized.

Figure 11:
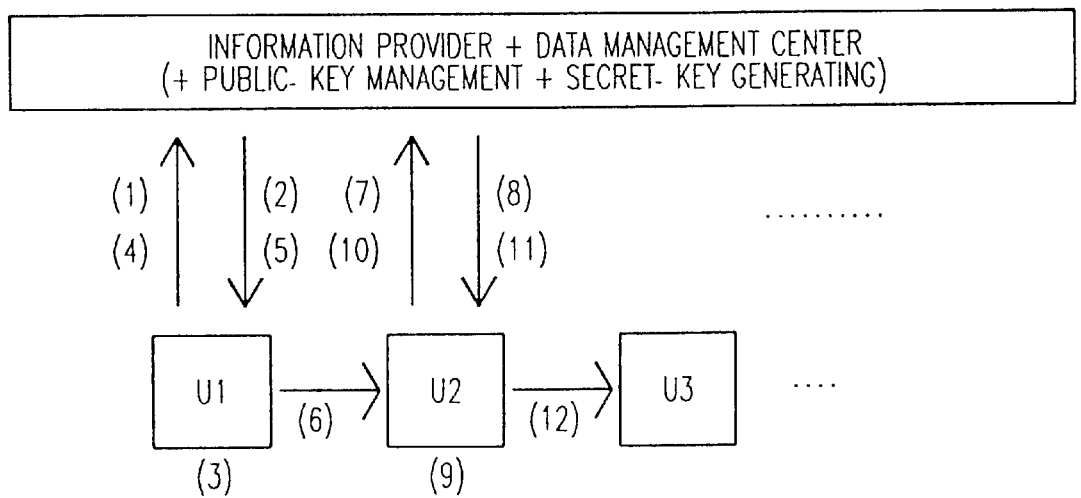
FIG. 11 represents a conceptional structure of a data management system of a fourth embodiment of the present invention.

A description is provided below on the fourth embodiment referring to FIG. 11. In this embodiment, the original copyright owner and the information provider holding the copyrighted data are discriminated from the user who does not hold copyrighted data, and are arranged on the network side with the data management center and the like.

In the system of this embodiment, public-key and private-key are used. If original copyrighted data is transferred to a user, the original copyrighted data is encrypted by using a secret-key or a public-key of transferred destination for the purpose of security.

The first user U1 searches the copyrighted data and collects necessary copyrighted data utilizing the network, broadcasting or recording medium. The collected copyrighted data is simply stored temporarily on memory of the user U1. Even when data storage unit such as a hard disk drive is included in the device of the user U1, the copyrighted data is not stored in the data storage unit.

In order that the copyrighted data is not stored, when there is an attempt to store it, inhibition of storage of the copyrighted data is performed by destroying the copyrighted data on memory, changing data header on memory, turning the data to one-way hash value, changing file name to non-storable file name, etc.

While it is possible to inhibit the storage by data storage inhibition program, which is incorporated in the program of the copyrighted data having object structure, higher reliability is accomplished if the storage inhibition is performed by an operating system, which is related to the entire system or to the user's device.

A description is given below on a case-where a plurality of copyrighted data are utilized in the fourth embodiment.

(1), (2) The first user U1 presents the first user label Lu1 to the data management center, collects the original copyrighted data M0i (i=1, 2, 3, . . . ) from data library of the information provider IP in the system and obtains a edit tool Pe. In this case, the original copyrighted data M0i and the edit tool Pe are encrypted using public-key Kb1 of the first user U1:

$$Cm0ikb1 = E(M0i, Kb1)$$

$$Cpekb1 = E(Pe, Kb1)$$

and the encrypted original copyrighted data Cm0ikb1 and the encrypted edit tool Cpekb1 are distributed to the first user U1.

In this case, the first user label Lu1 is referred, and utilizing conditions of the original copyrighted data M0i and the edit tool Pe are recorded at the data management center and are utilized for charging of a fee.

(3) When the encrypted original copyrighted data Cm0ikb1 and the encrypted edit tool Cpekb1 are distributed, the first user U1 decrypts the distributed encrypted original copyrighted data Cm0ikb1 and the encrypted edit tool Cpekb1 using private-key Kv1 of the first user U1:

$$M0i=D(Cm0ikb1, Kv1)$$

$$Pe=D(Cpekb1, Kv1).$$

Using the decrypted edit tool Pe, the decrypted original copyrighted data M0i is edited, and a first edited copyrighted data M1i (i=1, 2, 3, . . . ) is obtained.

(4) Obtaining the first edited copyrighted data M1i, the first user U1 encrypts a first scenario S1i, which is the editing process data for the first edited copyrighted data M1i, using public-key Kbc of the data management center:

$$Cs1ikbc=E(S1i, Kbc)$$

and presents the encrypted first scenario Cs1ikbc together with the first user label Lu1 to the data management center, so that secondary copyright of the user U1 is registered.

(5) When the encrypted first scenario Cs1ikbc is presented, the data management center Cd decrypts the encrypted first scenario Cs1ikbc using private-key Kvc of the data management center:

$$S1i=D(Cs1ikbc, Kvc),$$

prepares a first edit label Le1 based on the presented user label of the first user U1 and the decrypted first scenario S1i, stores it in the data management center Cd, encrypts the first edit label Le1 using public-key Kb1 of the first user U1:

$$Cle1kb1=E(Lei, Kb1),$$

and transfers the encrypted first edit label Cle1kb1 to the first user U1.

(6) When the encrypted first edit label Cle1kb1 is transferred, the first user U1 decrypts the encrypted first edit label Cle1kb1 using private-key Kv1 of the first user U1:

$$Le1=D(Cle1kb1, Kv1),$$

encrypts the decrypted first edit label Le1 using public-key Kb2 of the second user U2:

$$Cle1kb2=E(Le1, Kb2)$$

and transfers the encrypted first edit label Cle1kb2 to the second user U2, but the first edited copyrighted data M1i or the encrypted first edited copyrighted data is not transferred to the second user U2.

When the computer of the first user U1 is provided with a data storage unit, there is possibility that the collected copyrighted data or the edited copyrighted data may be stored in the storage unit, however, storage inhibition as described above is carried out to exclude storage, copying and transfer.

In this case, it is possible, instead of the encrypted first edit label Cle1kb2, to use electronic fingerprint F1, which is obtained by turning the first edit label to one-way hash value. In so doing, it is possible to perform simplified transfer of the edit label by telephone voice.

(7) When the encrypted first edit label Cle1kb2 is transferred, the second user U2 decrypts the transferred encrypted first edit label Cle1kb2 using the private-key Kv2 of the second user U2:

$$Le1=D(Cle1kb2, Kv2),$$

encrypts the first edit label Le1 using the private-Key Kv2 of the second user U2:

$$Cle1kv2=E(Le1, Kv2)$$

and presents the encrypted first edit label Cle1kv2 together with the second user label Lu2 to the data management center Cd.

(8) When the encrypted first edit label Cle1kv2 and the second user label Lu2 are presented, the data management center Cd decrypts the presented encrypted first edit label Cle1kv2 using public-key Kb2 of the second user U2:

$$Le1=D(Cle1kv2, Kb2),$$

collects the original copyrighted data M0i shown on the decrypted first edit label Le1, edits the original copyrighted data M0i using the edit tool Pe based on the first scenario S1i described on the first edit label Le1, and reproduces the first edited copyrighted data M1i.

When the first edited copyrighted data M1i is reproduced, the data management center Cd encrypts the first edited copyrighted data M1i and the edit tool Pe using the public-key Kb2 of the second user U2:

$$Cm1ikb2=E(M1i, Kb2)$$

$$Cpekb2=E(Pe, Kb2)$$

and transfers the encrypted first edited copyrighted data Cm1ikb2 and the encrypted edit tool Cpekb2 to the second user U2.

(9) When the encrypted first edited copyrighted data Cm1ikb2 and the encrypted edit tool Cpekb2 are distributed, the second user U2 decrypts the distributed encrypted first edited copyrighted data Cm1ikb2 and the encrypted edit tool Cpekb2 using private-key Kv2 of the second user U2:

$$M1i=D(Cm1ikb2, Kv2)$$

$$Pe=D(Cpekb2, Kv2)$$

and edits the decrypted first edited copyrighted data M1i using the decrypted edit tool Pe, and the second edited copyrighted data M2i (i=1, 2, 3, . . . ) is obtained.

(10) When the second edited copyrighted data M2i is obtained, the second user U2 encrypts the second scenario S2i, which is editing process data of the second edited copyrighted data M2i, using the public-key Kbc of the data management center:

$$Cs2ikbc=E(S2i, Kbc)$$

and presents the encrypted second scenario Cs2ikbc together with the second user label Lu2 to the data management center Cd.

(11) When the encrypted second scenario Cs2ikbc is presented, the data management center Cd decrypts the encrypted second scenario Cs2ikbc using the private-key Kvc of the data management center Cd:

$$S2i=D(Cs2ikbc, Kvc),$$

prepares a second edit label Le2 based on the presented user label of the second user and the decrypted second scenario S2i, stores it in the data management center Cd, encrypts the second edit label Le2 using public-key Kb2 of the second user U2:

$$Cle2kb2=E(Le2, Kb2)$$

and transfers the encrypted second edit label Cle2kb2 to the second user U2.

(12) When the encrypted second edit label Cle2kb2 is transferred, the second user U2 decrypts the encrypted second edit label Cle2kb2 using private-key Kv2 of the second user U2:

$$Le2=D(Cle2kb2, Kv2),$$

encrypts the decrypted second edit label Le2 using public-key Kb3 of the third user U3:

$$Cle2kb3=E(Le2, Kb3)$$

and transfers the encrypted second edit label Cle2kb3 to the third user U3. Then, the same operation is repeated.

In the fourth embodiment using this distributed object system, the copyrighted data is not stored by the user, but it is stored only in the database. On the other hand, the user controls and stores only the information relating to user and editing, i.e. the edit label having information of the utilized original copyrighted data and the used edit tool, the editing scenario and the information of the user who has edited. Only this edit label is encrypted and transferred between the users. Therefore, the copyrighted data is not stored, copied or transferred.

Also, in the system of this embodiment, only the public-key and the private-key are used, and validity of this public-key is certified by the data management center in advance, and certification by the data management center is of absolute nature. Accordingly, it is a hierarchical type certification system represented by PEM.

The edit label to be transferred is encrypted by the user's public-key, the validity of which has been certified in advance, by the data management center, and it is transferred. Thus, its contents are reliable as it is indirectly certified by the data management center.

The edit label itself is transferred between the users without being transferred to the data management center, and it might well be said that it is horizontal distributed type certification system represented by PGP.

As described above, it is possible according to the system of this embodiment to attain a certification system, which has high reliability of the hierarchical type certification system and easiness to handle of the horizontal distributed type certification system.

Behavior and contents of behavior of the users utilizing the copyrighted data are all identified by the user label presented by the users at the data management center. The utilization including editing of the copyrighted data is carried out through the data management center. Accordingly, the identity of each user can be reliably confirmed, and by confirming the contents and the course of behavior, contents and history of the copyrighted data can be certified. When this certification of contents is applied to electronic commerce, it is possible to certify the contents of dealing by the data management center, i.e. to perform "electronic notarization".

Further, in case digital signature is put on the user label or on the edit label, and if computer virus enters the user label or the edit label, the data of the label is changed, and as a result, change occurs in the hash value. Therefore, by verifying digital signature, it is possible to detect intrusion of computer virus.

Even when digital signature is not given, if turning to hash value is performed, the user label or the edit label are made unavailable depending upon the changed hash value. Thus, it is possible to detect intrusion of computer virus.

Because behavior and contents of behavior of the users utilizing the copyrighted data are all identified by the user label presented by the users at the data management center, every charging system on the above functions effectively.

[Embodiment 5]

An embodiment in which a system of the present invention is applied to the electronic commerce will be given. A basic case is at first, explained in which all of the processings are performed through mediator as a data management center, referring to FIG. 12A.

(1) User U looks a products catalogue of the mediator S via network, and requests the mediator S electronic commerce data Qm as dealing data including quotation for desired products and information of order form and payment terms.

(2) When requested the electronic commerce data Qm, the mediator S encrypts a request R of the electronic commerce data Qm and first secret-key Ks1 by using public-key Kbm of maker M:

$$Crkbm=E(R, Kbm)$$

$$Cks1kbm=E(Ks1, Kbm)$$

and transfers encrypted request Crkbm and encrypted first secret-key Cks1kbm to the maker M.

(3) When received the encrypted request Crkbm and encrypted first secret-key Cks1kbm, the maker M decrypts the transferred encrypted request Crkbm and encrypted first secret-key Cks1kbm by private-key Kvm of the maker M:

$$R=E(Crkbm, Kvm)$$

$$Ks1=E(Cks1kbm, Kvm)$$

encrypts electronic commerce data Qm corresponding to the request R by using decrypted first secret-key Ks1:

$$Cqmks1=E(Am, Ks1)$$

and transfers encrypted electronic commerce data Cqmks1 to the mediator S.

(4) When received the encrypted electronic commerce data Cqmks1, the mediator S decrypts transferred encrypted electronic commerce data Cqmks1 by using the first secret-key Ks1:

$$Qm=D(Cqmks1, Ks1),$$

encrypts again the decrypted electronic commerce data Qm by using second secret-key Ks2:

$$Cqmks2=E(Qm, Ks2),$$

encrypts second secret-key Ks2 by using public-key Kbu of the user:

$$Cks2kbu=E(Ks2, Kbu)$$

and transfers encrypted electronic commerce data Cqmks2 and encrypted second secret-key Cks2kbu to the user U.

(5) When received encrypted electronic commerce data Cqmks2 and encrypted second secret-key Cks2kbu, the user U decrypts encrypted second secret-key Cks2kbu by using private-key Kvu of user U:

$$Ks2=D(Cks2kbu, Kvu),$$

decrypts encrypted electronic commerce data Cqmks2 by using decrypted secret-key Ks2:

$$Qm=D(Cqmks2, Ks2),$$

edits electronic commerce data by entering order contents into electronic commerce data, makes order sheet Qu, encrypts the order sheet Qu, thus filled in, by using the second secret-key Ks2:

$$Cquks2=E(Qu, Ks2)$$

and transfers encrypted order sheet Cquks2 to mediator S.

(6) When received encrypted order sheet Cquks2, mediator S decrypts the encrypted order sheet Cquks2 by using the second secret-key Ks2:

$$Qu=D(Cquks2, Ks2),$$

encrypts decrypted order sheet Qu by using public-key Kbm of the maker M:

$$Cqukbm=(Qu, Kbm)$$

and transfers encryptd order sheet Cqukbm to the maker M.

When received encryptd order sheet Cqukbm, the maker M decrypts encryptd order sheet Cqukbm by using private-key Kvm of maker M:

$$Qu=E(Cqukbm, Kvm)$$

and the order is accepted and handled according to order contents of the decrypted order sheet Qu.

Figure 12A:
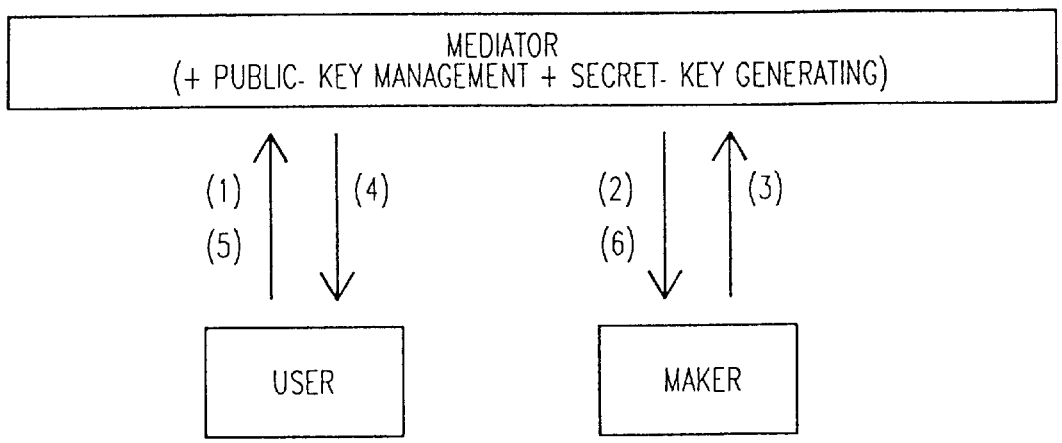
FIG. 12A and FIG. 12B each represents a conceptional structure of a data management system of a fifth embodiment of the present invention.

Next, an example of exceptional case when a user orders directly to a maker will be explained, referring to FIG. 12B. In the exceptional case, steps before above-mentioned (4), in which encrypted electronic commerce data Cqmks2 and encrypted second secret-key Cks2kbu are transferred to user U, are same steps as basic case as shown in FIG. 12A. And therefore, same detailed description is not given here, and description of steps different from basic case is given.

(7) When received encrypted electronic commerce data Cqmks2 and encrypted second secret-key Cks2kbu, the user U decrypts encrypted second secret-key Cks2kbu by using private-key Kvu of the user U:

$$Ks2=D(Cks2kbu, Kvu),$$

decrypts encrypted electronic commerce data Cqmks2 by using decrypted second secret-key Ks2:

$$Qm=D(Cqmks2, Ks2),$$

enters order contents into decrypted electronic commerce data Qm, i.e., performing data editing, makes order sheet Qu, encrypts the order sheet Qu, thus filled in, by using the second secret-key Ks2:

$$Cquks2=E(Qu, Ks2)$$

and transfers encrypted order sheet Cquks2 to the maker M.

(8) When received encrypted order sheet Cquks2, the maker M transfers the encrypted order sheet Cquks2 to the mediator S.

(9) When received encrypted order sheet Cquks2, the mediator S decrypts the encrypted order sheet Cquks2 by using second secret-key Ks2:

$$Qu=D(Cquks2, Ks2),$$

encrypts decrypted order sheet Qu by using public-key Kbm of maker M:

$$Cqukbm=E(Qu, Kbm)$$

and transfers it to the maker M.

When received encrypted order sheet Cqukbm, the maker M decrypts the encrypted order sheet Cqukbm by using private-key Kvm of maker M:

$$Qu=D(Cqukbm, Kvm)$$

and handles the order according to contents of the order sheet Qu.

In this electronic commerce system, computer software handled via network other than commercial products, can be also applied in dealings. In this case, software P is encrypted by maker M by using private-key Kvm of the maker M:

$$Cpkvm=E(P, Kvm),$$

encrypted software Cpkvm is transferred to mediator S, encrypted software Cpkvm, thus transferred, is decrypted by the mediator S by using public-key Kbm of maker M:

$$P=D(Cpkvm, Kbm),$$

decrypted software P is encrypted by the mediator S by using public-key Kbu of user U:

$$Cpkbu=E(P, Kbu),$$

encrypted software Cpkbu is transferred to the user U, and the transferred encrypted software Cpkbu is decrypted by the user U by using private-key Kvu of user U:

$$P=D(Cpkbu, Kvu).$$

Crypt keys for encrypted software which is stored in recording medium such as CD-ROM are distributed free, and the crypt keys can be further, applied in dealings in the electronic commerce system, in the manner of similar way for computor software described above.

In the basic case as described referring to FIG. 12A, since all of the dealing processings are performed through the mediator, various troubles caused in omitting the mediator among dealing processes can be previously prevented.

Figure 12B:
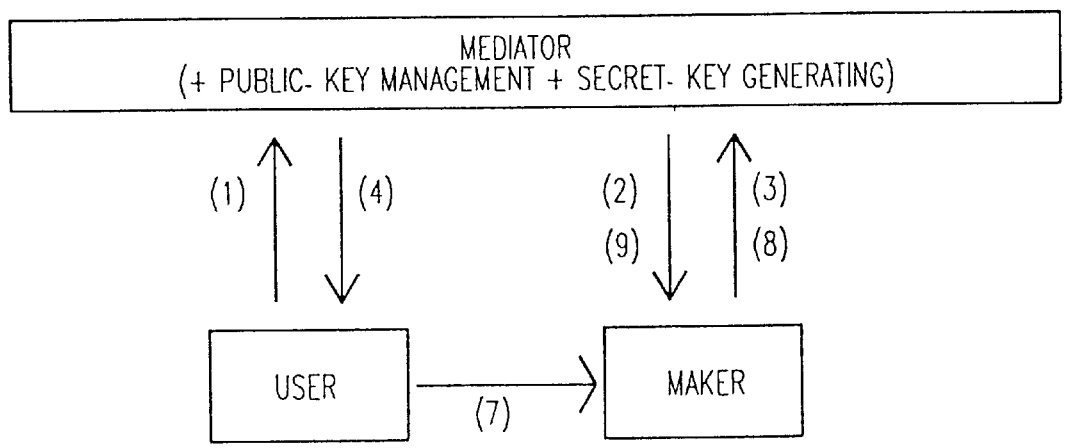

In exceptional case as described referring to FIG. 12B, further, in order that the maker receives the content of order sheet and handles the order, it is necessary that encrypted order sheet is transferred to the mediator and decrypted by the mediator. Therefore, the mediator takes part in the dealing processes without fail in this case also, and thus, various troubles caused in omitting the mediator among dealing processes can be previously prevented. The secret-key which is transferred, may be transferred incorporated in electronic commerce data other than transferred alone.

In each embodiment described hereinbefore, while data or label is encrypted/decrypted, the burden of encryption and decryption is rather high. In case that the data and label are transferred via network, these are encrypted by secret-key and in addition, are encrypted by public-key. Therefore, in order to utilize the transferred data and label, these are necessary to be decrypted by private-key and in addition, to be decrypted by secret-key.

In order to reduce the burden of encryption and decryption, while partly encrypting is described as shown in FIGS. 4A to 4G, if the processing ability of the user device is not high, even when partly encrypting, performing both processings of encryption/decryption by secret-key system, which is for copyright management, and encryption/decryption by public-key system, which is for data security, is yet difficult.

To cope with the above problems, encryption/decryption, which is processing other than encryption/decryption for protecting transferred data or label, may be performed, for example, by an entity in the network, and encrypted/decrypted data or label is transferred to a user.

While encryption/decryption for protecting transferred data or label is performed generally by public-key cryptosystem, this encryption/decryption is performed by a device of user.

Above processing of encryption/decryption performed by an entity in the network may be applied to the case of reproduction of edited copyrighted data in the third and forth embodiments.

In the third embodiment, encrypted copyrighted data and non-encrypted edit label including editing scenario are transferred from one user to next user. The non-encrypted edit label and corresponding secret-key are stored in data management center. The next user transfers transferred encrypted copyrighted data and non-encrypted edit label to the data management center, and therefore, the copyrighted data is decrypted, and thus, edited copyrighted data is reproduced based on decrypted copyrighted data and the edit label. Then, the edited copyrighted data is transferred to the next user.

In the fourth embodiment, encrypted edit label including editing scenario is only transferred from a user to next user. In contrast, the edit label is stored in the data management center. And therefore, the data management center, by transferred encrypted edit label to the data management center by the next user, collects necessary original data based on the edit label and reproduces edited copyrighted data, and then, transfers the edited copyrighted data to the next user.

It is understood that particular embodiments described herein should not limit the present invention thereby. This invention can be practiced in connection with any data management system.

Thus, a database copyright control system has been described, which is applicable to multimedia system.

I claim:

1. A system for managing digital data to be transferred from an owner of data to a user of data via broadcast, a communication network or data recording medium, comprising:
   public-key, private-key, user label and edit label used in the data management system;
   a data management center and the owner linked to a public-key storage, and arranged on said communication network;
   said data management center certifying public-keys of said owner and said user and storing said user label and said edit label;
   a first user obtaining said digital data from said communication network by presenting said user label to use said digital data, editing the digital data, and obtaining said edit label from said communication network by presenting said user label and an editing scenario,
   wherein said digital data is not stored in a device of each of said user after using said digital data, and said edit label is transferred to a next user without said digital data for the next user's use of said digital data.

2. A data management system according to claim 1, wherein said digital data is not stored in the device of said user by deletion of said digital data.

3. A data management system according to claim 1, wherein said digital data is not stored in the device of said user after said digital data is converted to a one-way hash value.

4. A data management system according to claim 1, wherein said data management center is further linked to secret-key generator, and said digital data is encrypted by using a secret-key of said secret-key generator and stored in the device of said user.

5. A data management system according to claim 1, wherein said edit label is encrypted by using public-key of said next user, and is transferred to said next user;
   said next user decrypts the encrypted edit label by using private-key of aid next user and presents said decrypted edit label to said data management center;
   said data management center transfers the digital data to said next user based on said edit label;
   said next user uses and edits said digital data by using the editing scenario included in said edit label.

6. A data management system according to claim 1, wherein said first user transfers said edit label to said next user;
   said next user presents said edit label to said data management center;
   said data management center transfers said digital data to said next user based on said edit label;
   said next user uses and edits said digital data by using the editing scenario included in said edit label.

7. A data management system according to claim 6, wherein said first user performs digital signature to said edit label by using private-key of said first user.

8. A data management system according to claim 1 wherein there are a plurality of said digital data.

9. A data management system according to claim 1 wherein charging a fee is performed by presenting said user label to said data management center by said user.

10. A data management system according to claim 9, wherein the charging a fee is performed by metering post-payment method based on use results.

11. A data management system according to claim 10, wherein the metering data based on use results is stored in said data management center.

12. A data management system according to claim 10, wherein the metering data based on use results is stored in a device of said user.

13. A data management system according to claim 9, wherein the charging fee is performed by prepayment method.

14. A data management system according to claim 13, wherein the prepayment data is stored in said data management center.

15. A data management system according to claim 13, wherein the prepayment data is stored in a device of said user.

16. A data management system according to claim 1 wherein said digital data has a general file structure and a data body thereof only is encrypted.

17. A data management system according to claim 16, wherein a part of said data body is encrypted.

18. A data management system according to claim 17, wherein the part of said data body with encryption is repeatedly arranged in said data body.

19. A data management system according to claim 17, wherein a plurality of parts of said data body with encryption is intermittently arranged in said data body.

20. A data management system according to claim 1 wherein said digital data has a general file structure, and a data header and a data body thereof are encrypted.

21. A data management system according to claim 20, wherein a part of said data header and entire part of said data body are encrypted.

22. A data management system according to claim 20, wherein a part of said data header and a part of said data body are encrypted respectively.

23. A data management system according to claim 1 wherein said digital data has a general file structure and a data header thereof only is encrypted.

24. A data management system according to claim 23, wherein entire part of said data header is encrypted.

25. A data management system according to claim 23, wherein a part of said data header only is encrypted.

26. A data management system according to claim 1 wherein said digital data has a general file structure, and only said user label is encrypted.

27. A data management system according to claim 26, wherein only a part of said user label is encrypted.

28. A data management system according to claim 1 wherein said digital data has an object-formed file structure, and only a method is encrypted.

29. A system for electronic commerce between maker and user via mediator, comprising:

said mediator is linked to a first entity to manage public-keys and a second entity to generate secret-keys and is arranged on a communication network;

said user requests electronic commerce data from said mediator;

said mediator transfers the request of said electronic commerce data together with a first secret-key of said second entity, which are encrypted by using a public-key of said maker, to said maker;

said maker decrypts the encrypted first secret-key by using a private-key of said maker, and encrypts said electronic commerce data using the decrypted first secret-key and transfers encrypted electronic commerce data to said mediator;

said mediator decrypts said encrypted electronic commerce data using said first secret-key, re-encrypts decrypted electronic commerce data using a second secret-key of said second entity, and transfers the re-encrypted electronic commerce data together with the second secret-key, which are encrypted using a public-key of said user, to said user;

said user decrypts the encrypted second secret-key using a private-key of said user, decrypts the re-encrypted electronic commerce data using the decrypted second secret-key, makes an order sheet by entering order content into the decrypted electronic commerce data, encrypts said order sheet using the second secret-key for, and transfers the encrypted order sheet to said mediator;

said mediator decrypts said encrypted order sheet using said second secret-key, encrypts the decrypted order sheet using the public-key of said maker, and transfers the encrypted order sheet to said maker; and said maker decrypts the encrypted order sheet using the private-key of said maker, and makes an order acceptance.

30. An electronic commerce system according to claim 29, wherein said electronic commerce data has a general file structure and only a data body thereof is encrypted.

31. An electronic commerce system according to claim 30, wherein a part of said data body is encrypted.

32. An electronic commerce system according to claim 31, wherein the part of said data body with encryption is repeatedly arranged in said data body.

33. An electronic commerce system according to claim 31, wherein a plurality of parts of said data body with encryption is intermittently arranged in said data body.

34. An electronic commerce system according to claim 29, wherein said electronic commerce data has a general file structure, and a data header and a data body thereof are encrypted.

35. An electronic commerce system according to claim 34, wherein a part of said data header and the entire part of said data body are encrypted.

36. An electronic commerce system according to claim 34, wherein a part of said data header and a part of said data body are encrypted respectively.

37. An electronic commerce system according to claim 29, wherein said electronic commerce data has a general file structure and only a data header thereof is encrypted.

38. An electronic commerce system according to claim 37, wherein entire part of said data header is encrypted.

39. An electronic commerce system according to claim 37, wherein a part of said data header only is encrypted.

40. An electronic commerce system according to claim 29, wherein said electronic commerce data has a general file structure and only label is encrypted.

41. An electronic commerce system according to claim 40, wherein a part of said label only is encrypted.

42. An electronic commerce system according to claim 29, wherein said electronic commerce data has an object-formed file structure and a method is encrypted.

* * * * *